United States Patent [19]
Lubbers et al.

[11] Patent Number: 5,761,501
[45] Date of Patent: Jun. 2, 1998

[54] STACKED SKIP LIST DATA STRUCTURES

[75] Inventors: Clark E. Lubbers, Colorado Springs; Susan G. Elkington, Black Forest, both of Colo.

[73] Assignee: Digital Equipment Corporation, Maynard, Mass.

[21] Appl. No.: 537,375

[22] Filed: Oct. 2, 1995

[51] Int. Cl.$^6$ .................................................. G06F 17/30
[52] U.S. Cl. ......................... 395/611; 395/603; 395/462; 395/470
[58] Field of Search ................... 395/603, 611, 395/601, 462, 470, 613

[56] References Cited

U.S. PATENT DOCUMENTS

| | | | |
|---|---|---|---|
| 4,603,380 | 7/1986 | Easton et al. | 395/440 |
| 5,261,088 | 11/1993 | Baird et al. | 395/622 |
| 5,263,160 | 11/1993 | Porter, Jr. et al. | 395/603 |
| 5,285,528 | 2/1994 | Hart | 395/726 |
| 5,301,290 | 4/1994 | Tetzlaff et al. | 395/469 |

OTHER PUBLICATIONS

William Pugh, "Skip Lists: A Probabilistic Alternative to Balanced Trees", Communications of the ACM, Jun. 1990, vol. 33, No. 6, pp. 668–676.

Robert Sedgewick, *Algorithms*, Addison–Wesley Publishing Co. (1988), pp. 15–33.

Jeffrey Esakov and Tom Weiss, *Data Structures*, Prentice-Hall, Inc. (1989), pp. 54–65.

*Primary Examiner*—Thomas G. Black
*Assistant Examiner*—Jack M. Choules
*Attorney, Agent, or Firm*—Cathy L. Peterson; Ronald C. Hudgens; Arthur W. Fisher

[57] ABSTRACT

Disclosed herein is a stacked skip list data structure for maintaining select nodes on multiple lists. The data structure includes a primary and a secondary skip list of nodes. Each node in the primary skip list uses at least one forward pointer in a primary array of forward pointers and provides a node level field for storing the level of such node, the level determined by the number of pointers being used. A secondary skip list is stacked on the primary skip list of nodes. It includes a subset (zero or more nodes) occurring on the primary skip list and utilizes zero or more unused forward pointers in the primary array as its forward pointers. Thus, a system agent performing operations on the secondary skip list utilizes the node level in the node level field as an index into the primary array of forward pointers to locate the secondary array of forward pointers.

8 Claims, 3 Drawing Sheets

STACKED SKIP LIST DATA STRUCTURES

FIELD OF THE INVENTION

The present invention relates generally to performing operations on data described by skip list data structures stored in a digital computer memory, and in particular, to skip list data structures optimized to support select nodes describing a particular class of the data on multiple lists to increase efficiency of operations pertaining to such data.

BACKGROUND OF THE INVENTION

A critical problem in many appliacation is the ability to locate a specific data item in a stored set of data items in an efficient manner. One well-known and widely used solution is the binary tree. The performance of binary tree routines is, on average, very good, but suffer when data manipulation is not localized. The insertion or removal of data in order, for example, can produce an unbalanced tree structure, thus leading to extremely poor search performance. Consequently, after an insertion or deletion, a tree must be rebalanced if an imbalance has been introduced. Specific balance tree techniques, such as AVL trees, have been designed to rearrange the tree to correct imbalance which occur as operation are performed, but may incur a compute overhead unacceptable to some application. In cache controller applications, for example, a cache manager is expected to dynamically delete as well as add cache index entries to the caching data structures. The extra overhead required for such operations may be unacceptable in the cache controllers of embedded control systems, like storage controllers, having real-time performance constraints.

Skip lists, a variant of linked linked linear lists, provide yet another approach. Specific information on skip lists and related algorithms is presented and discussed at some length in a paper by William Pugh, entitled "Skip Lists: A Probabilistic Alternative to Balanced Trees", Communications of the ACM, June 1990, pp. 668–676. In this paper, Professor Pugh suggests skip lists as a performance-enhanced alternative to balanced trees for situations requiring the frequent insertion or removal of keyed items in an ordered search structure.

Essentially, a skip list is an ordered, linked linear list of list elements, or nodes, in which some nodes contain extra pointers that skip intermediate nodes, thus increasing the speed of searches. A node with i extra forward pointers is known as a level i node. The pointers of a level i node are indexed from 0 to i; the pointer at index i in the node points to the next node of level i or greater in the list, according to the ordering scheme of the list. Thus, the pointer at index 0 of a node always points to the next node, but the pointer at index 2 of a node will point to the next node of level 2 or higher. The level of a node, from 0 to some maximum M, which is a property of the skip list, is assigned when it is inserted into the skip list. A random number generator is used, causing the probablility of a node being at level L or higher to be $1/(b^L)$, where b is a property of the skip list. Hereafter, a base of b=4 is assumed; however, the choice of b (as well as M) is up to the implementer.

Like other linked list data structures, skip lists generally begin with a "list head" which points to the first node in the list. In the case of skip lists, however, the list head has M pointers, indexed in the same way as for any node in the skip list.

Skip lists have the following properties: search time proportional to log(#entries); insertion time proportional to log(#entries); delete time proportional to log(#entries); and extremely simple code—approximately ¼ the size of an AVL tree implementation. Each entry of a search structure needs room for a maximum of M pointers; the best performance will be obtained when M>=log[base b](maximum number of entries in the list), although a smaller value of M will work with reduced performance. If variable-size entries are allocated, the average number of pointers actually used per entry is less than two, which is less memory overhead than used by AVL trees.

Thus, skip list data structures provide an efficient means for managing cached data. Caching is an important design technique for increasing computer performance by reducing the effective access time of the primary storage media. Cache memory increases the effective speed of the primary media by responding quickly with a copy of the most frequently used data. During a read cycle, the high speed cache will respond first if it has a copy of the requested data. Otherwise, the primary media is accessed and the cache is updated with a copy of the requested data. If a cache miss occurs and the cache is full, the new data will have to replace data already in the cache. During a write cycle, the primary media is the destination of the write data. This operation then may update, invalidate or delete data from the cache memory accordingly, to ensure that the cache memory does not contain obsolete data. The operation is complete only after the primary media has been updated. The performance benefit of the "write-through" policy is that subsequent reads may find the data (cache hit) in the cache memory, thereby avoiding accessing the primary media. There is no benefit in write performance. Under a "write-back" policy, the writes to the primary media may be performed at some future time. The operation is complete when the data has reached the cache memory, thus effectively improving write performance. Unwritten data ("dirty" data) is written ("flushed") to the primary media under the control and scheduling of the cache management software.

The utilization of a write-back policy brings about one notable deficiency in a skip list cache indexing scheme. If a particular portion of cache data is to be flushed, its corresponding node must first be located. Although a skip list can be searched in known fashion and the "non-dirty" nodes bypassed when locating the next node representing flushable data, a large skip list sparsely populated with nodes containing or referencing dirty data would result in a significant number of memory references since the bypassing is proportional to the number of nodes on the list. One alternative to this bypass technique is to expand the size of each node so that cache data state information can be accessed directly during the course of a search operation; however, such a solution requires the allocation of additional memory space on a costly "per node" basis.

Therefore, there exists in the art a clearly felt need for a skip list data structure that improves the efficiency of operations to locate data of a particular class (in the case of cache flush operations, data representing "dirty" blocks in the cache memory). Although two separate lists could be maintained, this would require two searches in most cases, doubling the search time as well as requiring more storage. This unresolved deficiency is solved by the present invention in the manner described below.

SUMMARY OF THE INVENTION

Accordingly, it is an object of the present invention to provide a skip list data structure enhancement which allows select nodes to exist on multiple skip lists simultaneously.

In a broad sense, the above and other objectives are attained by a digital computer system comprising a data structure stored in memory, the data structure including and supporting both a primary and a secondary skip list of nodes simultaneously. The primary skip list of nodes has a primary array of forward pointers and each node in the primary skip list uses at least one forward pointer. A node level field is provided in each node for recording a node level of such node, the level corresponding to the number of extra forward pointers being used.

The secondary skip list of nodes comprises zero or more nodes existing on the primary skip list and has a secondary array of forward pointers. The secondary array of forward pointers includes zero or more of the forward pointers of the primary array of forward pointers unused by the nodes of the primary skip list of nodes. To support a secondary list, each node contains a second node level field to record a secondary node level, indicating the number of the unused forward pointers in use by the node when it is inserted on a secondary skip list. The second node level field is not required unless a tertiary or higher level of stacked lists is to be implemented. In the present embodiment, the second node level field is used to optimize removal from the secondary skip list in certain common cases.

Further included in the system is a system agent for performing operations on the primary and secondary skip list. To operate on the secondary skip list, the system agent utilizes the node level field as an index into the primary array of forward pointers to locate the secondary array of forward pointers.

In a narrower sense, the present invention provides primary skip list as a normal list to allow finding for normal cache access operations and a secondary skip list, which is a subset of the primary skip list, as a flush control list to allow finding when performing a cache flush operation.

The enhanced skip list data structure of present invention offers several advantages. It increases the efficiency of certain system operations which may require access to only a subset of the nodes occurring in a skip list data structure. Further, the performance of a singular skip list data structure can be achieved for at least two skip lists without the cost of a significant amount of extra memory space.

BRIEF DESCRIPTION OF THE DRAWINGS

The above objects, features and advantages of the present invention will become more apparent from the following detailed description taken in conjunction with the accompanying drawings, in which.

DESCRIPTION OF THE PREFERRED EMBODIMENT

Figure 1:
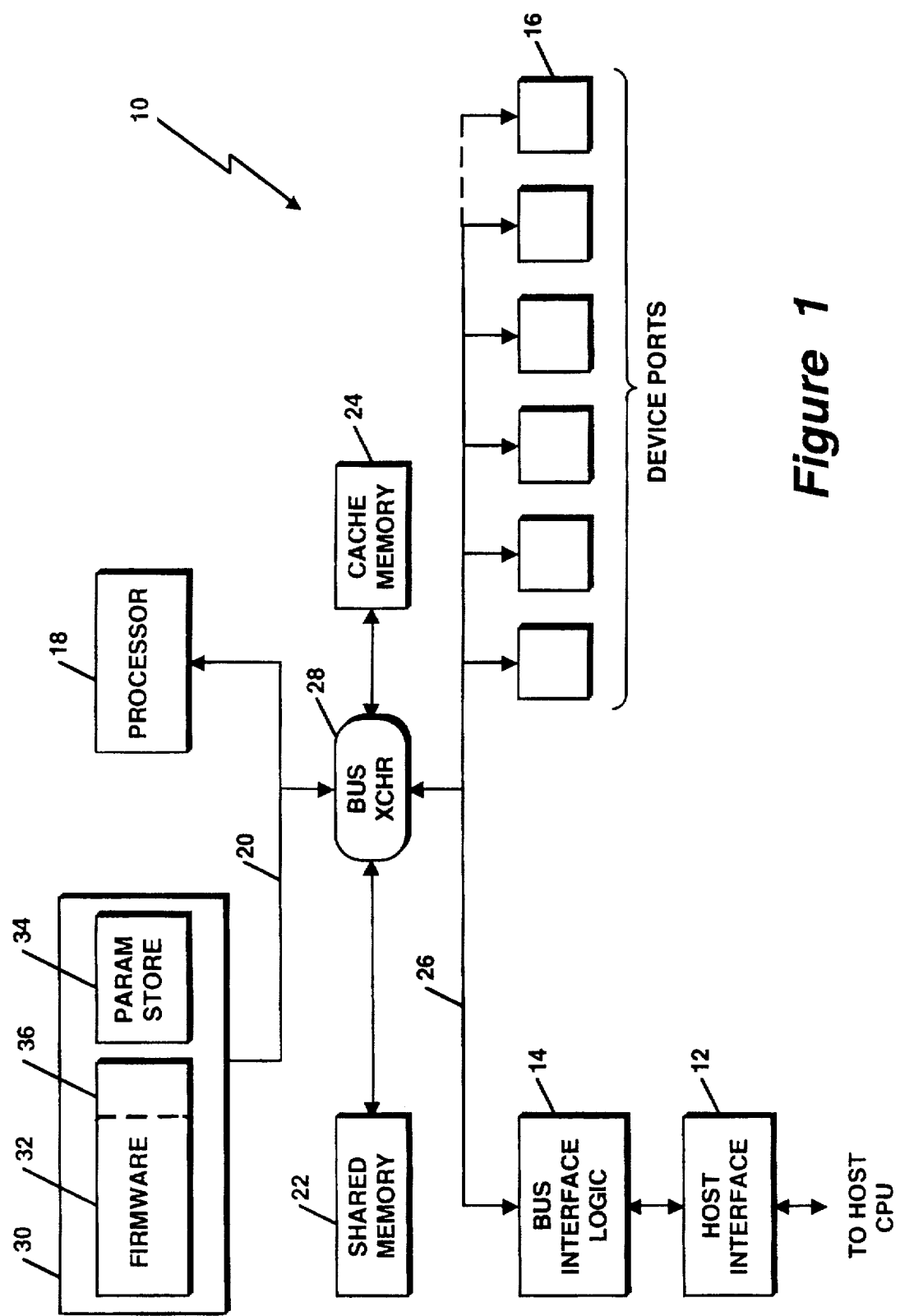
FIG. 1 is a general block diagram of a storage controller in a digital computer system utilizing the present invention.

An example of a digital computer system environment which utilizes the present invention is a storage controller 10, as illustrated in FIG. 1. Referring to FIG. 1, the storage controller 10 bridges a host interface 12 via a bus interface logic block 14 to one or more device ports 16, which provide an access path to a primary storage media (not shown). The controller 10 further includes a processor 18, residing on a native bus 20. Also included are a shared memory 22, which includes buffer memory and control functions, and a cache memory 24. Separate buses containing the shared memory 22 and cache memory 24 are interconnected to the native bus 20 and a bus 26 used to access the host interface through the bus interface logic block 14 and device ports 16 by way of a bus exchanger 28. The bus exchanger is a crossbar which provides fast access by all entities to all parts of the controller. In addition to providing required bus interface logic, the bus interface logic block 14 may also include and thus represents other functional components typically needed to perform low level device and host port operations support.

Sharing the native bus 20 used by the processor is a nonvolatile memory 30. The nonvolatile memory 30 stores the controller firmware 32 and parameter data 34, and is read each time the controller boots. Included as a subcomponent of the firmware is the caching firmware, shown simply as a system agent 36. Although the firmware is contained in the nonvolatile memory 30, it is copied to the shared memory 22 at initialization for subsequent execution. Stored in the shared memory 22 are certain caching data structures, which are created and maintained by the system agent 36. Some of the caching data structures are organized as skip lists of nodes, each node containing information which describes a portion of the cache data stored in the cache memory 24, in accordance with the principles of the present invention.

In the preferred embodiment of the present invention, the system agent 36 caches data in the cache memory 24 under a write-back cache update policy. Since data is write-back cached, there is no need to write to the primary storage media. Until the data is written to the primary storage media, the data is considered dirty. Cache nodes describing memory containing dirty data are automatically placed on a flush control list as "flushable nodes", since they correspond to cache data which is potentially flushable. Generally, a flush I/O operation is generated whenever there are flushable nodes and a maximum number of permitted flush I/O operations has not been exceeded. In addition to the flush mechanism thus described, flushing can occur under a variety of other conditions. For example, the system agent may periodically flush dirty data that has not been used for some time or that can be flushed due to some "opportunity window". The amount of dirty data for a particular device or set of drives could exceed a dynamic limit, thus triggering a flush operation. These are but a few examples of system events which can result in the performance of a flush operation. With respect to the present invention, it is sufficient to note that a flush control list is employed to keep track of the cache nodes which correspond to dirty cache data in the cache memory. Thus, dirty cache nodes appear, along with the clean nodes, on a normal skip list for use during normal find operations, as well as on a flush control list for use during flush operations.

The system as thus described with reference to FIG. 1 is intended to illustrate only those aspects of the storage controller which pertain to the present invention. Hence, some functions are omitted and others simplified to a level appropriate to a discussion of the present invention. Nor is the scope of the invention limited by the particular features of the illustrated system. The principles of the present invention may be applicable to other digital computer systems having skip list data structures in memory and devices or agents for manipulating such data structures. Further, the present invention may have application to other types of operations which benefit from having select nodes existing simultaneously on multiple lists.

Figure 2:
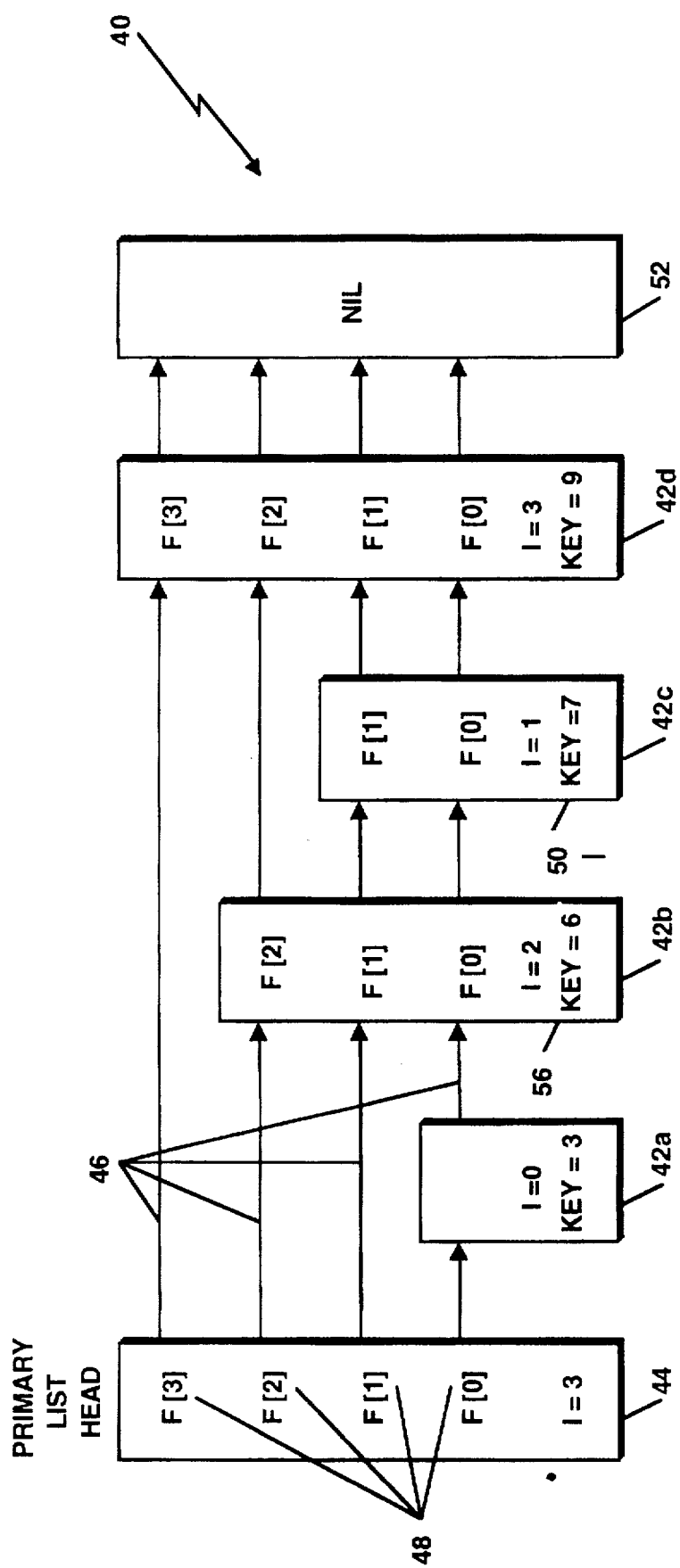
FIG. 2 is an illustration of a 4-level skip list data structure.

FIG. 2 illustrates an example of a four-level skip list data structure 40, which provides a "primary" list upon which a "secondary" list is stacked in accordance with the present invention. In the preferred embodiment, the primary list is a normal list and the secondary list is a flush control list of "flushable" nodes occurring on the primary list. Referring to FIG. 2, the skip list data structure 40 has four data elements or "nodes" 42a–d. Although the example depicts a four-level list having four nodes, the invention is not so limited. A list head 44 points to the list and provides a primary array of forward pointers 46 indexed lowest to a maximum number 48, the index thus indicating the level within the list of a given one of the forward pointers. In the example shown, the lowest index is "0" and the maximum index is "3". The maximum index corresponds to the maximum level or maximum supported list level. Each node or data element of the nodes 42a–d has an assigned key 50, used by the system agent during search operations.

Contained in each node shown in FIG. 2 are one or more of the primary array forward pointers 46, each of the forward pointers linking such node to a successor node. At least one of the forward pointers allocated to each node points to an "immediate" successor node, which is the successor node immediately adjacent to such node and corresponds to the lowest index. The number of forward pointers allocated to any given node is determined probabilistically at insertion time. The level associated with each of the nodes 42a–d is related to the number of forward pointers allocated to and used by that node. Each of the forward pointers in a given node links such node to a next node of node level at least as great as the forward pointer index. Being so linked, that next node thus becomes a successor node with respect to the given node. Again, reference may be had to the article by William Pugh, entitled "Skip Lists: A Probabilistic Alternative to Balanced Trees", Communications of the ACM, Jun. 1990, pp. 668–676, for further information on skip lists and, more particularly, node level generation.

Returning to FIG. 2, the end of the list is indicated by a stored null or "NIL" value 52. This null value may point to a dedicated "NIL" node, which serves to terminate the list and is distinguished by having a key which is greater than any possible real key. Such a "NIL" node is described in the Pugh paper. Alternatively, a null pointer "NULLPTR" (value=0) may be used in a particular node to indicate that the next node is, in that given instance, the NIL node. Consequently, the algorithm must check the pointer in each node to determine if it is the NULLPTR and, if it is, take appropriate measures "as though" the next node has a key greater than the search key.

Each nodes of the skip list data structure 40 illustrated in FIG. 2 also stores or records in an information field a node level or "primary" node level 56, represented in FIG. 2 as "1", which is equal to the index of the highest level forward pointer in that particular node as previously defined with respect to FIG. 2. If the forward pointers in a node are indexed from 0 to some integer i and every node has a level 0 forward pointer, then "1" is equal to the number of extra pointers allocated to the node. In the preferred embodiment, it is desirable to employ a NULLPTR to point to the NIL node as discussed above.

Returning to FIG. 2, it should be noted that one or more of the primary array forward pointers 46 are not used by certain nodes. For instance, the node 42a representing key=3 is not using f[1], f[2] and f[3]. Since this memory is not used, it is available for use by a stacked skip list according to the principles of the present invention.

Figure 3:
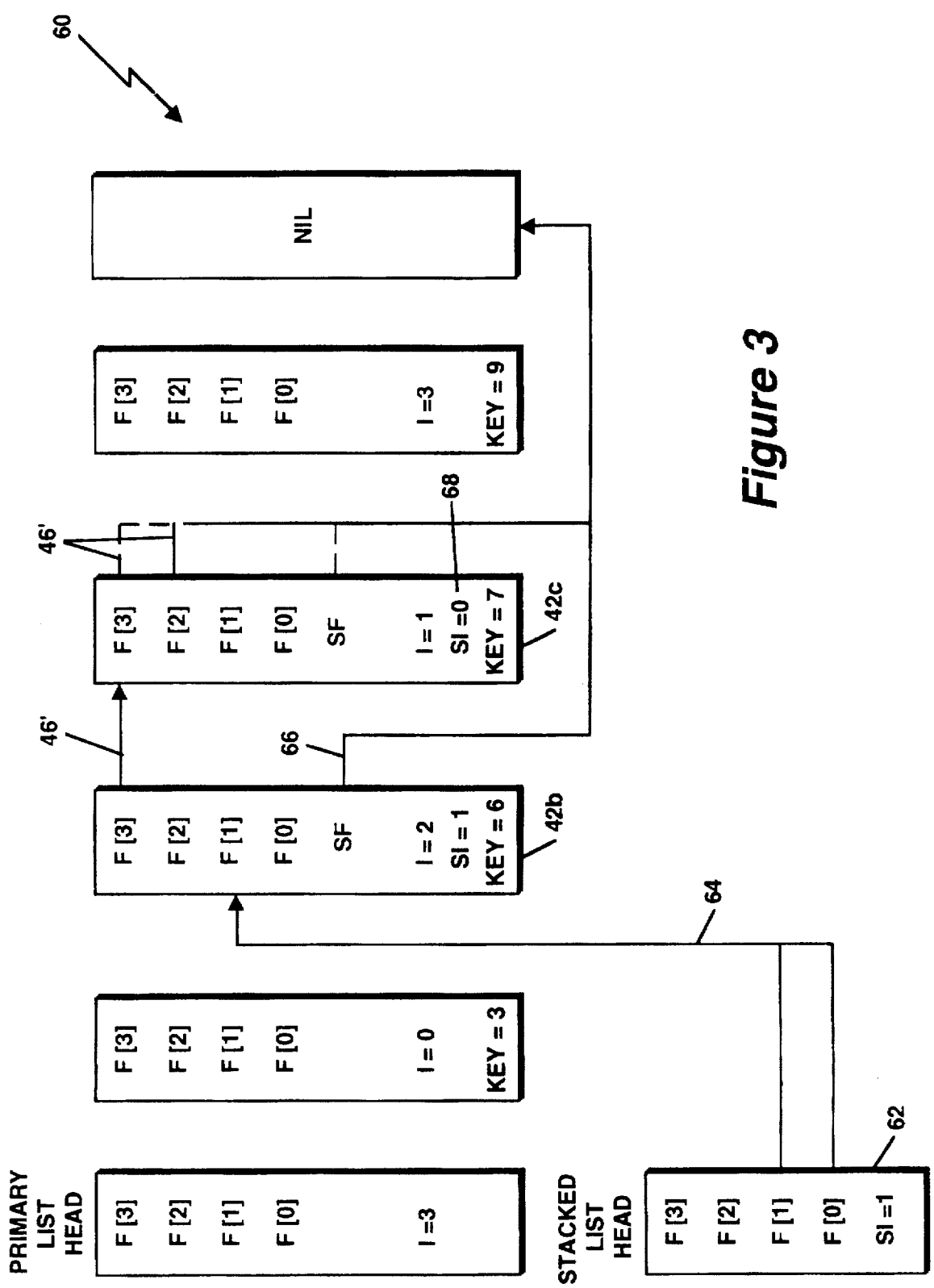
FIG. 3 is an illustration of "stacked" skip list data structure according to the principles of the present invention, the stacked skip list data structure having the skip list data structure shown in FIG. 2 as a primary skip list data structure.

FIG. 3 presents an example of a "stacked" skip list data structure 60, in which select nodes are maintained on more than one list. An example of a C structure defining such a select node (i.e., a node on the primary list chosen for insertion on a secondary list) of a 4-level stacked skip list data structure is as follows:

| #define MAX_LEVELS 4 | | /* Maximum Skip List Levels */ |
| typedef struct __node | | |
| { | | |
| int | *f[MAX_LEVELS]; | /* Forward Pointers */ |
| int | *sf; | /* Stacked List Forward Pointer */ |
| int | l; | /* List Level */ |
| int | sl; | /* Stacked List Level */ |
| int | key; | /* Search Key */ |
| } node; | | |

As can be seen in the above example, the select node has all of the attributes of a node on the primary skip list as described with reference to FIG. 2, but with a few additions. With respect to FIG. 3, it should be noted that the primary array of forward pointers has been omitted in part to avoid pointer confusion. Although not shown, the primary array of forward pointers in the skip list data structure of FIG. 3 is the same as the primary array of forward pointers 46 illustrated in FIG. 2.

Referring to FIG. 3, the creation of a stacked skip list data structure requires a secondary or "stacked" list head 62. The secondary list head 62 is an independent structure which points to a secondary skip list of nodes, comprised of zero or more nodes occurring on the primary skip list. The secondary skip list of nodes thus includes a secondary array of forward pointers, the secondary array of forward pointers including zero or more forward pointers of the primary forward pointer array unused by the nodes of the primary skip list. In the example shown in FIG. 3, the forward pointers of the secondary array for the nodes of the secondary skip list include those indicated by references 64 and 46'. The reference 46' indicates those forward pointers of the primary array unused by nodes on the primary skip list but used by those same nodes on the secondary skip list. When a node is inserted in the secondary skip list, it is assigned a node level that is restricted by the number of unused forward pointers in that node. The new secondary skip list node is allocated one or more of the unused forward pointers and uses them in the same manner as the primary skip list. The secondary list level (as well as each node level) is also statistically generated to balance the secondary skip list to allow for efficient search of that list.

In the example of FIG. 3, the nodes 42b and 42c, corresponding to keys 6 and 7, respectively, are supported on both the primary and secondary skip lists. Therefore, the secondary list head points to the first node on the primary skip list that is also on the secondary skip list. In the example, the first node which is maintained on both lists is the node 42b corresponding to the key=6. Since forward pointer f[3] (the level 3 pointer of the primary forward pointer array for that node) is unused by node 42b on the primary skip list, the node uses the forward pointer f[3] to point to the next node—node 42c —occurring on the secondary skip list as shown in the figure. As forward pointers f[2] and f[3] are unused by node 42c on the primary skip list and 42c is the last node to occur on the secondary skip list, these forward pointers point to NIL.

The secondary skip list further requires the inclusion of an additional secondary forward pointer ("sf") 66. The additional secondary forward pointer is not part of the primary array of forward pointers as it is used only for those nodes which reside on both the primary and secondary skip lists.

It is necessary to include the additional secondary forward pointer in each node to ensure that a maximum level node on the primary skip list (i.e., a primary skip list node which uses the forward pointers available at all levels/indices) can still be inserted on the secondary skip list. The additional secondary forward pointer is physically adjacent to the maximum level forward pointer of the primary forward pointer array.

In order for the secondary skip list to be its own independent skip list, capable of being operated on by the same algorithms (i.e., search, insertion and removal of nodes) utilized in conjunction with the primary skip list, each node has the memory capacity in the form of an additional information field to record a second node level ("sl") 68. Like the node level of the primary skip list, the second node level of each node on the secondary skip list is statistically generated at insertion time, but is bounded at insertion time by the number of unused (available) forward pointers as previously indicated. The probability of being forced to restrict the level is quite low, though, as it is sum of the products of combinations of levels which exceed the total number of pointers available. The secondary node level held in the second node level field thus indicates the number of the unused forward pointers (in the node on the primary skip list) in use by the node when it is on the secondary skip list. It is important to note that a field to record the secondary node level is desirable but not required unless a tertiary level "stacked" list is implemented.

Searching/insertion/removal of a node from the secondary skip list is basically similar to those algorithms for the primary skip list, with a notable exception. Unlike the primary array of forward pointers, which can be accessed directly, the secondary array of forward pointers is located by indexing into the primary pointer array using the primary node level. Thus, the performance of a singular skip list can be achieved for two skip lists with the addition of only a small amount of memory.

The primary and secondary skip lists are dependent in that a data element on the secondary skip list must occur on the primary skip list. The forward pointers for the secondary skip list stack on top of the pointers for the primary skip list. It is believed that this concept may be extended to accommodate an element being stacked on an arbitrary number of skip lists, the arbitrary number of skip lists (arbitrary number of list heads) being restricted by the maximum supported list level, should there be a need for more than two as described herein.

Although the above description has proceeded with reference to a specific embodiment of the invention, the invention is not necessarily limited to the particular embodiment shown herein. It is to be understood that various other adaptations and modifications may be made within the spirit and scope of the invention as set forth by the claims.

What is claimed:

1. A data structure stored in a digital computer memory comprising:
    a primary skip list of nodes, the primary skip list of nodes having a primary array of forward pointers, each node in the primary skip list using at least one forward pointer and having a node level field for recording a primary node level of such node, the primary node level corresponding to the number of extra forward pointers being used; and
    a secondary skip list of nodes, each node of the secondary skip list of nodes existing on the primary skip list of nodes, the secondary skip list of nodes having a secondary array of forward pointers, the secondary array of pointers including zero or more forward pointers of the primary pointer array which are unused by the node of the primary skip list of nodes, the primary node level providing an index into the primary array of forward pointers to locate the secondary array of forward pointers.

2. A data structure stored in a digital computer memory according to claim 1, wherein the primary skip list has a maximum level, further comprising:
    an additional secondary forward pointer in each node of the secondary skip list of nodes, the additional secondary forward pointer enabling insertion on the secondary skip list of any of the primary skip list nodes including a primary skip list node at the maximum level on the primary skip list.

3. A data structure stored in a digital computer memory according to claim 2, wherein the primary array of forward pointers includes a maximum level forward pointer corresponding to a maximum level of the primary skip list of nodes and the additional secondary forward pointer is adjacent to the maximum level forward pointer of the primary skip list of nodes.

4. A data structure stored in a digital computer memory according to claim 1 further comprising:
    a second node level field in each node within the nodes of the secondary skip list, the second node level field for storing a secondary node level associated with such node of the secondary skip list, the secondary node level indicating the number of forward pointers unused for the node of the primary skip list and being used by the node on the secondary skip list.

5. A data structure stored in a digital computer memory according to claim 1, wherein the nodes of the secondary skip list are a subset of the nodes of the primary skip list.

6. A data structure stored in a digital computer memory comprising:
    a primary skip list of nodes, the primary skip list of nodes having a primary array of forward pointers, each node in the primary list using at least one forward pointer and having a node level field for recording a primary node level of such node, the primary node level corresponding to the number of pointers being used; and
    a secondary skip list of nodes, the secondary skip list nodes being a subset of the nodes existing on the primary skip list, the secondary skip list of nodes each including a secondary array of forward pointers including zero or more of the forward pointers of the primary array of forward pointers unused by the node on primary skip list of nodes, the secondary skip list of nodes further including an additional secondary forward pointer in each node of the secondary skip list of nodes to ensure that a maximum level node on the primary skip list can be inserted on the secondary skip list.

7. A digital computer system comprising:
    a memory;
    a data structure stored in the memory, the data structure including a primary skip list of nodes, the primary skip list of nodes having a primary array of forward pointers, each node in the primary skip list using at least one forward pointer and having a node level field for recording a primary node level of the node, the primary node level determined by the number of forward pointers being used, the data structure further including a secondary skip list of nodes, the secondary skip list nodes including zero or more of the nodes existing on the primary skip list and a secondary array of forward pointers, the secondary array of forward pointers including zero or more of the forward pointers of the primary array of forward pointers unused by the node on the primary skip list of nodes, the secondary skip list of nodes further including an additional secondary forward pointer in each node of the secondary skip list of nodes and a second node level field for storing a secondary node level associated with the corresponding node of the secondary skip list of nodes; and a system agent for performing maintenance operations on the primary and secondary skip lists, the system agent utilizing the node level field to index into the primary array of forward pointers to locate the secondary array of forward pointers.

8. A digital computer system comprising:

a memory;

a data structure stored in the memory and describing cached data, the data structure including a normal skip list of nodes, the nodes of the normal skip list including flushable nodes describing dirty cached data, the normal skip list of nodes having a primary array of forward pointers, each node in the primary skip list using at least one forward pointer and having a node level field for recording a primary node level of the node, the primary node level determined by the number of forward pointers being used, the data structure further including a flush control skip list of nodes, the flush control skip list nodes including the flushable nodes occurring on the normal skip list and a secondary array of forward pointers, the secondary array of forward pointers including zero or more of the forward pointers of the primary array of forward pointers unused by the nodes of the normal skip list of nodes, the flush control skip list of nodes further including an additional secondary forward pointer in each node of the secondary skip list of nodes; and a system agent for performing a flush operation by locating the flushable nodes on the flush control skip list, the system agent utilizing the node level field to index into the primary array of forward pointers to locate the secondary array of forward pointers.

* * * * *